(12) United States Patent
Clark

(10) Patent No.: US 12,435,746 B2
(45) Date of Patent: Oct. 7, 2025

(54) BUSH RETENTION SYSTEM

(71) Applicant: HMD Seal/Less Pumps Ltd., Eastbourne (GB)

(72) Inventor: David Clark, Eastbourne (GB)

(73) Assignee: HMD Seal/Less Pumps Ltd., Eastbourne (GB)

( * ) Notice: Subject to any disclaimer, the term of this patent is extended or adjusted under 35 U.S.C. 154(b) by 743 days.

(21) Appl. No.: 17/766,165

(22) PCT Filed: Oct. 1, 2020

(86) PCT No.: PCT/GB2020/052406
§ 371 (c)(1),
(2) Date: Apr. 1, 2022

(87) PCT Pub. No.: WO2021/064404
PCT Pub. Date: Apr. 8, 2021

(65) Prior Publication Data
US 2022/0372974 A1    Nov. 24, 2022

(30) Foreign Application Priority Data

Oct. 1, 2019  (GB) .................................... 1914171

(51) Int. Cl.
*F16B 21/18*  (2006.01)

(52) U.S. Cl.
CPC .................................. *F16B 21/18* (2013.01)

(58) Field of Classification Search
CPC ...... F16B 21/18; F16B 21/183; F16B 21/186; F16D 1/116; Y10T 403/7033; Y10T 403/7047; Y10T 403/7061
(Continued)

(56) References Cited

U.S. PATENT DOCUMENTS 4,351,450 A * 9/1982 Summerfield ........ F16B 21/183
220/319
6,139,216 A * 10/2000 Bertetti ............... B60B 27/0084
403/365
(Continued)

FOREIGN PATENT DOCUMENTS

CN      208348303 U    1/2019
EP        1681477 A1 *  7/2006 .............. F16B 21/18
(Continued)

OTHER PUBLICATIONS

Search Report under Section 17(5) issued Feb. 21, 2020, for priority UK Application No. 1914171.2.
(Continued)

*Primary Examiner* — Josh Skroupa
(74) *Attorney, Agent, or Firm* — Renner, Otto, Boisselle & Sklar, LLP

(57) ABSTRACT

A bushing system for use in a magnetic drive or canned motor pump, the system comprising: a bush holder having an axial recess for receiving a bush, a bush for insertion into the axial recess, the bush and bush holder each having: one or more cooperating features which abut against each other when the bush is fitted into the recess; and a recess for receiving at least part of a retention member; wherein, when the cooperating features abut, the retention member recesses on the bush holder and the bush are axially offset.

15 Claims, 3 Drawing Sheets

(58) Field of Classification Search
USPC .................................... 403/359.5, 365, 372
See application file for complete search history.

(56) References Cited

U.S. PATENT DOCUMENTS

| | | | | |
|---|---|---|---|---|
| 6,561,720 | B2 * | 5/2003 | Wirth | F16B 21/183 |
| | | | | 403/368 |
| 7,481,711 | B2 * | 1/2009 | Fukumura | F16D 1/116 |
| | | | | 403/359.5 |
| 8,425,142 | B2 * | 4/2013 | Disser | F16D 1/116 |
| | | | | 403/359.5 |
| 9,353,752 | B2 | 5/2016 | Tetzlaff et al. | |
| 9,958,069 | B2 * | 5/2018 | Bueter | F16J 1/10 |
| 9,989,075 | B2 * | 6/2018 | Bueter | F15B 15/1438 |
| 10,138,943 | B2 * | 11/2018 | Kraus | F16D 1/116 |
| 10,253,819 | B2 * | 4/2019 | Sherlock | F16B 21/18 |
| 10,422,388 | B2 * | 9/2019 | Mabe | F16D 1/116 |
| 2019/0277006 | A1 | 9/2019 | Stolz | |

FOREIGN PATENT DOCUMENTS

| | | | | | |
|---|---|---|---|---|---|
| GB | | 2256248 A | * | 12/1992 | ............ F16B 21/18 |
| WO | WO-2006080132 A1 | * | 8/2006 | ............ F16D 3/223 |

OTHER PUBLICATIONS

International Search Report and Written Opinion mailed Nov. 13, 2020, for priority International Patent Application No. PCT/GB2020/052406.

* cited by examiner

BUSH RETENTION SYSTEM

This application is a national phase of International Application No. PCT/GB2020/052406 filed Oct. 1, 2020, which claims priority to United Kingdom Application No. 1914171.2 filed Oct. 1, 2019, the entire disclosures of which are hereby incorporated by reference.

This invention relates to a bushing system and in particular to a bushing system which can be used in a magnetic drive or canned motor pump Magnetic drive pumps, for example the CSA/CSI pump from the applicant being a typical example, are required to operate over a wide range of application temperatures. The stator part of a magnetic drive pump bearing system typically comprises a structural metal housing and bearing material bushes—typically silicon carbide or carbon, although other materials are sometimes employed.

The bush parts are typically interference fitted into the structural metallic bush housing. This achieves several purposes—(i) the bushes are rigidly fixed and retained in the structural housing, (ii) the bushes are prevented from rotating, in reacting the rotation of the rotor part(s), and (iii) the bush material is good in compression, but may crack in tension and so interference fitting the bush into a bush holder ensures that the bush stays compressed.

The disadvantages of this interference fitted bush system construction include (a) a wide range of metallurgies and/or interference fits have to be employed to cater for process liquid compatibility and differences in application temperature ranges, respectively, for example, variations in material coefficient of thermal expansion between the bushes and bush holder have to be accounted for in the design of the interference fits, and (b) interference fitting these parts together requires specialist equipment and is extremely difficult to facilitate in the field, should a breakdown occur.

Thus, it would be an advantage to provide an improved system for retaining a bush in a bush holder, preferably addressing one or more of the above problems.

According to the present invention there is provided a bushing system for use in a magnetic drive or canned motor pump, the system comprising a bush holder having an axial recess for receiving a bush, a bush for insertion into the axial recess, the bush and bush holder each having: one or more cooperating features which abut against each other when the bush is fitted into the recess; and a recess for receiving at least part of a retention member; wherein, when the cooperating features abut, the retention member recesses on the bush holder and the bush are axially offset.

The cooperating features preferably includes one or more shoulders.

The retention member recesses are preferably axially misaligned. The retention member recesses may overlap in the axial direction.

One or both retention member recesses are preferably annular.

The retention member recess in the bush holder may be axially further than the retention member recess in the bush from the cooperating features.

The system above may further comprise a retention member. The retention member may be compliant.

The retention member and the axially offset recesses may combine to provide a biasing force which urges the bush and bush holder towards each other.

The bush and bush holder preferably each have one or more axially extending mating surfaces which are in contact when the bush is inserted in the bush holder.

The mating surfaces are preferably complementary to limit relative rotation of the bush and bush holder.

The mating surfaces are preferably configured such that they prevent relative rotation of the bush and bush holder.

A system according to claim 12, wherein portion of each mating surface matches the opposite surface exactly.

One or more of the retention member recesses may be annular.

One or more of the retention member recesses may be partially circumferential.

One or more of the retention member recesses may be arcuate sections.

Multiple retention member recesses may be provided on one or both of the bush and bush holder.

The retention member may be toroidal in shape.

The retention member may have a circular, square, parallelogram or hexagonal cross-section.

The present invention will now be described by way of example with reference to the accompanying drawings. In the drawings.

Figure 1:
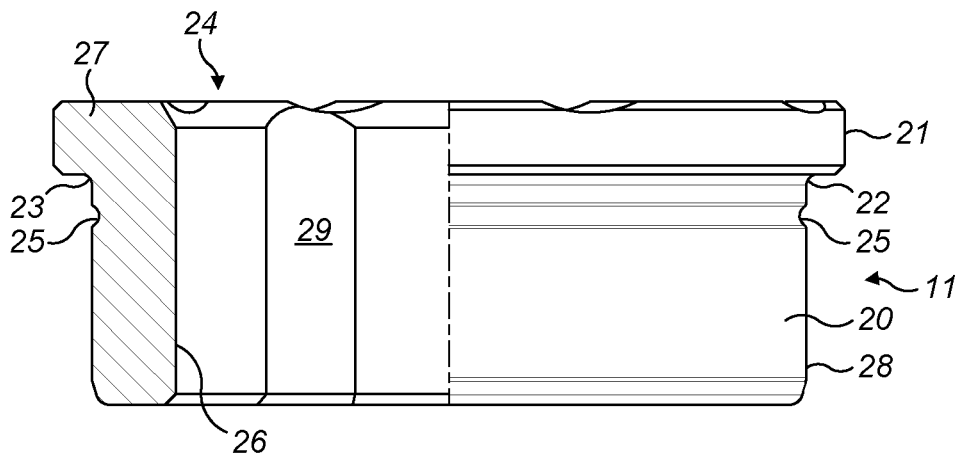
FIG. 1 shows an exploded view of the components of a bush retention system according to one example of the invention.
Figure 1:
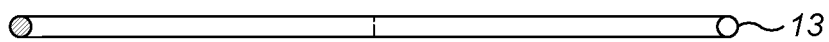
Figure 1:
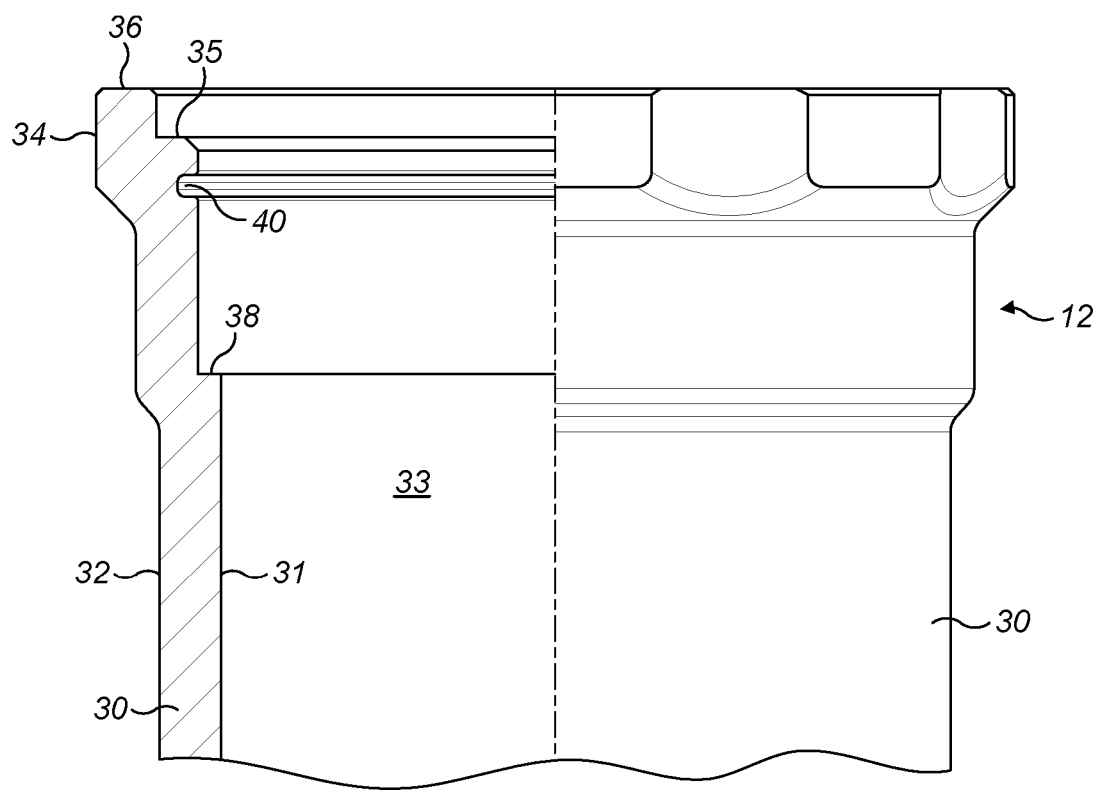

FIG. 1 shows the three individual components that form the bush retention system 10. The three components are a bush 11, a bush holder 12 and a retention member 13. The left-hand half of FIG. 1 shows the components 11,12 and 13 as an axial section, and the right-hand half of FIG. 1 shows an outer view of the solid component.

Bush 11 has a main body section 20 which is generally cylindrical in form with, at the upper end in FIG. 1, a wider flange section 21. The flange need not be at an end, but it is generally preferable that it is at an end. The flange and main body section define a shoulder 22 therebetween. The shoulder 22 includes a chamfered section 23, in this case a curve which may have a relatively small radius of curvature when compared to the diameter of the main body section. The chamfer may take an alternative form including one or more straight sections. The chamfer may be omitted and the flange 21 and main body section 20 could meet a hard angle, such as a right angle.

The main body section 20 of bush 11 defines an axially extending passageway 24. The passageway will typically, as in this example, extend all the way through the bush such that it takes the form of an open passageway. The passageway is typically of a constant cross section, both in shape and size. The recess/passageway 24 is for receiving in use a shaft which is intended to rotate with the bush 11. The passageway 24 is generally circular in cross section and is defined by an inner surface 26 of a wall 27 which forms the main body section 20. The wall 26 has an outer surface 28. One or more (three in this case at equally spaced radial positions) axially extending recesses or indents 29 are formed in the inner surface 26 and these are always open at each end to permit liquid to flow along the inner surface 26.

The main body section 20 includes a retention member recess 25 formed in the outer surface 28. The recess may have a curved cross-section, which may be a complete semi-circle or may only be arcuate. The cross section is preferably constant along the entire length of the recess. Alternative cross sections are possible and may be dependent upon the size and/or shape of retention member 13 being used. In this Figure, the recess 25 extends all the way around the main body section 20. In this example, the main body section 20 is substantially circular in cross section, and thus the recess 25 is circular. The recess may not be a single recess extending all the way round the main body section, but instead may be two or more partially circumferential recesses. These may be evenly spaced around the main body section.

Bush holder 12 is typically a structural component, usually formed from a metallic material (typically stainless steel 316L). The bush holder 12 is formed by a wall 30 having inner 31 and outer 32 surfaces. An axially extending passage 33 passes axially from one end to the other (normally, at the other end, a matching formation is provided for receiving another bush 11). The outer surface 32 of the wall 30 is stepped in several locations to aid the location of the bush holder within other components. The upper (in the figures) end 36 of the bush holder 12 has a larger diameter than other portions of the holder 20, thereby defining a bush holder neck 34.

Figure 2:
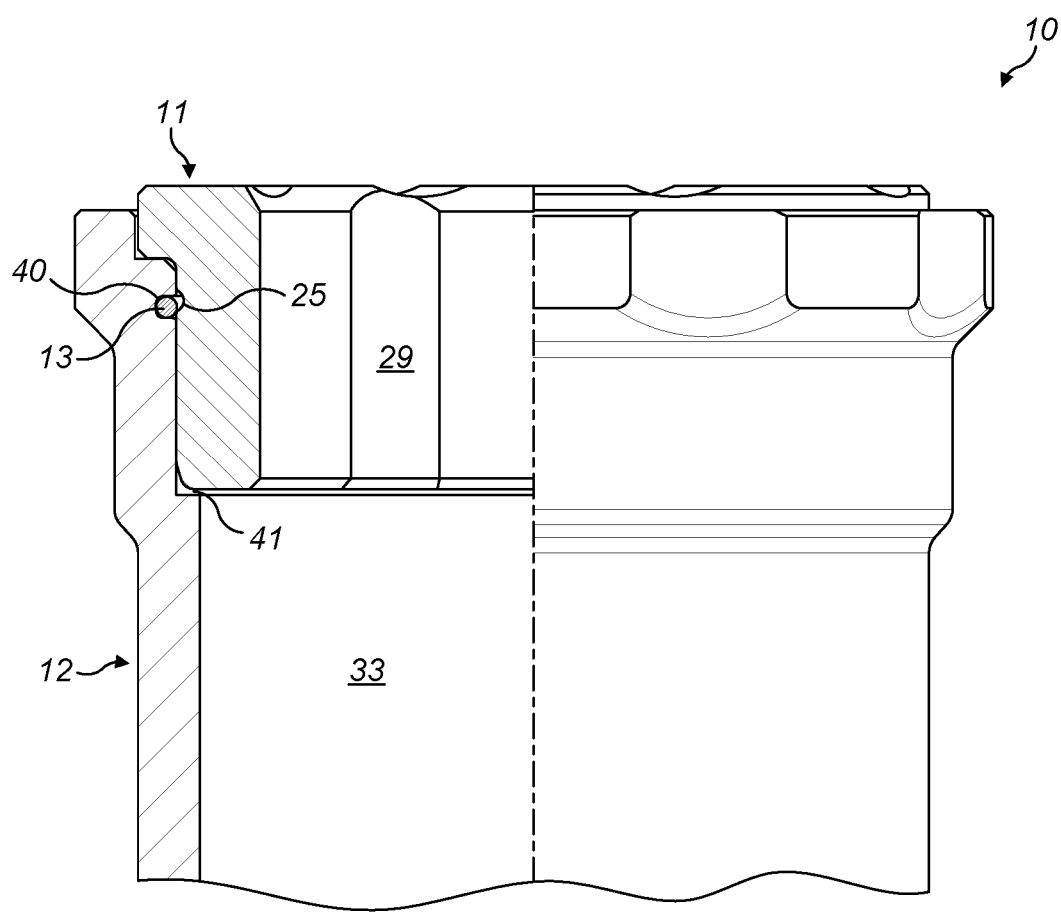
FIG. 2 shows a bush fitted into a bush holder in line with the invention

The upper end 36 of the passageway 34 in bush holder 12 is intended to receive the lower end of bush 20. The inner surface of the wall 30 is formed with a pair of shoulders/seats 35, 38. A bush holder shoulder 35 is formed toward the upper end of the inner surface of wall 30. The shoulder 35 may be identical in size and/or shape to the shoulder 23 of the bush 11 such that, when the bush is inserted into the bush holder, shoulder 23 rests on shoulder 35. Alternatively, the shoulder 35 may take a different shape and/or size, for example a 45 degree angled surface relative to the curve of shoulder 23, so as to act as a lead-in so the retention member 13 can more easily slide into the bore of the bush holder. Seat 38 in the bush holder is preferably positioned, as can be seen in FIG. 2, such that when the bush has been inserted into the bush holder, there is a small gap between seat 38 and the lower most surface of the bush 11, so that the axial bearing load is reacted by shoulder 35.

A bush holder retention recess 40 is formed axially between the shoulder 35 and seat 38. The recess may have a curved cross-section, which may be a complete semi-circle or may only be arcuate. The cross section is preferably constant along the entire length of the recess. Alternative cross sections are possible and may be dependent upon the size and/or shape of retention member 12 being used. In this Figure, the recess 40 extends all the way around the inner surface 31. In this example, the inner surface 31 is substantially circular in cross section, and thus the recess 40 is circular. The recess may not be a single recess extending all the way round the main body section, but instead may be two or more partially circumferential recesses. These may be evenly spaced around the main body section. The partial recesses of the bush holder are preferably located at the same circumferential positions as any partial recesses in the bush 11.

Retention member 13 typically takes the form of an o-ring as these are commonly available and easy install, especially as there is no specific orientation required. The retention member may have a different cross section. The shape of the cross section of the retention member may correspond to the recesses, i.e. an o-ring would typically have semi-circular/arcuate cross section recesses, a square cross section retention member would typically have square/rectangular recesses. The retention member 13 is preferably formed from a compliant material. When the retention member extends around the full circumference of the bush main body 20, it may additionally act as a seal, e.g to prevent liquid traveling across the axial or radial bearing surfaces and lubricates the axial and radial 'bearings' respectively from short-circuit the bearing system by travelling along the clearance gap between the bore of the bush-holder and the outside diameter of the bush. The compliant material may be an elastomer (e.g. FKM, FFKM, EPDM, etc) or a thermosetting plastic (e.g. PTFE, nylon, etc) depending on process liquid compatibility. The range of retention materials which can be employed not only caters for a wide range of process liquid chemical compatibilities, but also enables the 'spring stiffness' of the journal bearing system to be optimised by the choice of the most appropriate material.

If the retention member is for fitting within a recess that is only partially circumferential, then a circlip or other appropriate device could be used in place of an o-ring.

FIG. 2 shows the bush 11, bush holder 12 and bush retention member 13 in a constructed arrangement in which the shoulder 23 and shoulder 35 abut. It can be seen that the bush retention recess 23 and the bush holder retention recess 40 are at different axial positions, i.e. they are axially misaligned or offset. In particular, bush retention recess 25 is located axially closer than the bush holder retention recess 40 to the flange 21. This axially misalignment means that the retention member 13 causes a biasing force to be applied between the bush 11 and the bush holder 12, such that the two components are urged axially towards each other into face to face contact.

The bush 11, in the example, extends out of the upper end 36 of the bush holder 12, so as to prevent the rotor part of the bearing reacting with the stainless steel bush-holder, as opposed to the silicon carbide bush, causing wearing, particulate and damage. The lowermost end of the bush 11 is axially spaced from the seat 38 in the bush holder 12 thereby defining an annular gap 41.

The retention member also serves to centre the bush 11 in relation to the bush holder 12 and provides stiffness and a radial compressive load to the bush. The use of the retention member with the axial offset allows the bush and bush holder faces to be presented in the optimum position with no distortion (such as dishing or coning) of the faces due to the interference fitting of the parts. This results in improved operation, that would be expected to give longer life as a consequence.

The fitting diameter of the bush 11 is preferably a clearance fit to the bush holder bore 33. This eliminates the need for an interference fitting operation and the specialist (heating) equipment that this involves. It can also mean that the retrofit operation becomes a simple push fit of one component into another, an operation that is more conducive to field servicing of magnetic drive pumps. Finally, it also reduces the number of permutations of bush to bush holder fits that are needed to cover a wide range of duty temperatures, thereby allowing one bush holder size to fit all applications, simplifying manufacture, stocking and supply of spare parts.

In general, the present design of bush and bush holder is much simplified taking complexity out of the parts required and the sub-assembly build process. This lends itself to field retrofit and distributor building or servicing of equipment, avoiding the need to return an item to factory for repair, thereby maximising the time the item in which the bush and bush holder are located can remain operational.

Whilst the figures show a single retention member recess in each of the bush and bush holder, it may be possible to use multiple pairs of recesses, and provide multiple retention members, one for each pair of recesses. Two or more retention members may be used, each with a respective pair of retention member recesses in the bush and bush holder. However, any increase in the number of retention members and recesses also increases the assembly friction, which makes assembly and disassembly more difficult. As such, it is better to keep the number of retention members as low as possible, and most preferably a single retention member is used.

Figure 3:
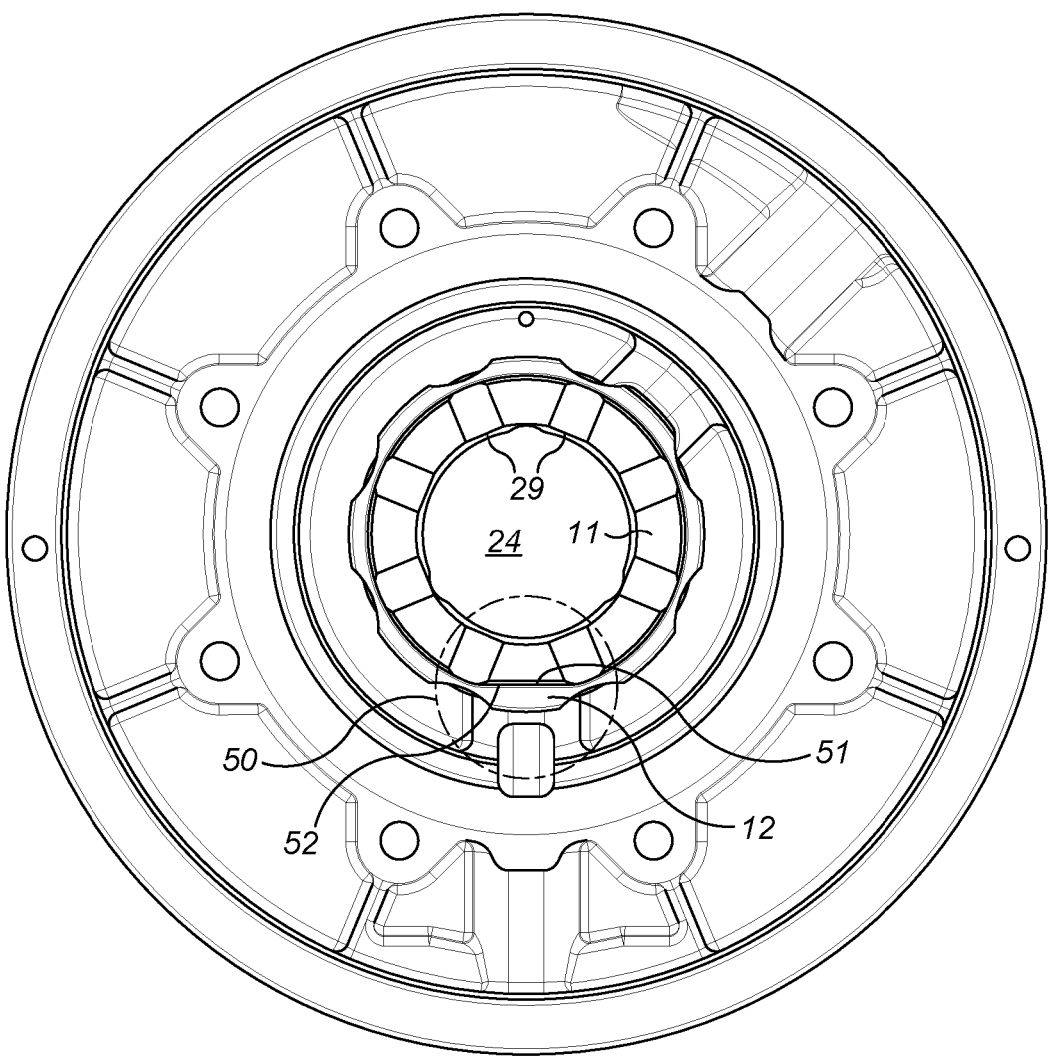
FIG. 3 shows an axial end view of the bush inserted into a bush holder.

FIG. 3 illustrates a further feature of the bush and bush holder fitting. The engagement between the bush 11 and the bush holder 12 features an anti-rotation system 50 whereby a flat edge 51 on the outside diameter of the bush 11 (typically on the flange 21), fits to a corresponding flat feature 52 milled into the end of the inner surface 31 of the bush holder 12. This is shown end-on in FIG. 3. Anti-rotation features often require a separate part, e.g. a pin, wire, circlip, etc., which can shake loose and again requires different metallurgies for the sake of chemical compatibility with the process liquid. The integration of the flat feature into the bearing system, provides an anti-rotation method that is simple, effective and further reduces the 'parts-count'.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A bushing system for use in a magnetic drive or canned motor pump, the system comprising:
   a bush holder having an axial recess for receiving a bush,
   a bush for insertion into the axial recess, the bush and bush holder each having:
      one or more cooperating features which abut against each other when the bush is fitted into the recess; and
   a retention member, wherein:
      the bush holder comprises an annular recess for receiving at least part of the retention member;
      the bush comprises an annular recess for receiving at least part of the retention member,
   wherein, when the cooperating features abut, the retention member recesses on the bush holder and the bush are axially offset, wherein the retention member and the axially offset recesses combine to provide a biasing force which urges the bush and bush holder towards each other.

2. A system according to claim 1, wherein the cooperating features includes one or more shoulders.

3. A system according to claim 1, wherein the retention member recesses are axially misaligned.

4. A system according to claim 3, wherein the retention member recesses overlap in the axial direction.

5. A system according to claim 1, wherein the retention member recess in the bush holder is axially further than the retention member recess in the bush from the cooperating features.

6. A system according to claim 1, wherein the retention member is compliant.

7. A system according to claim 1, wherein the bush and bush holder each have one or more axially extending mating surfaces which are in contact when the bush is inserted in the bush holder.

8. A system according to claim 7, wherein the mating surfaces are complementary to limit relative rotation of the bush and bush holder.

9. A system according to claim 8, wherein the mating surfaces are configured such that they prevent relative rotation of the bush and bush holder.

10. A system according to claim 9, wherein portion of each mating surface matches the opposite surface exactly.

11. A system according to claim 1, wherein one or more of the retention member recesses are partially circumferential.

12. A system according to claim 1, wherein one or more of the retention member recesses are arcuate sections.

13. A system according to claim 1, wherein multiple retention member recesses are provided on one or both of the bush and bush holder.

14. A system according to claim 1, wherein the retention member is toroidal in shape.

15. A system according to claim 1, wherein the retention member has a circular, square, parallelogram or hexagonal cross-section.

* * * * *